Nov. 1, 1966  G. W. YOUNGER  3,282,612
TUBE RETAINER
Filed Nov. 29, 1965
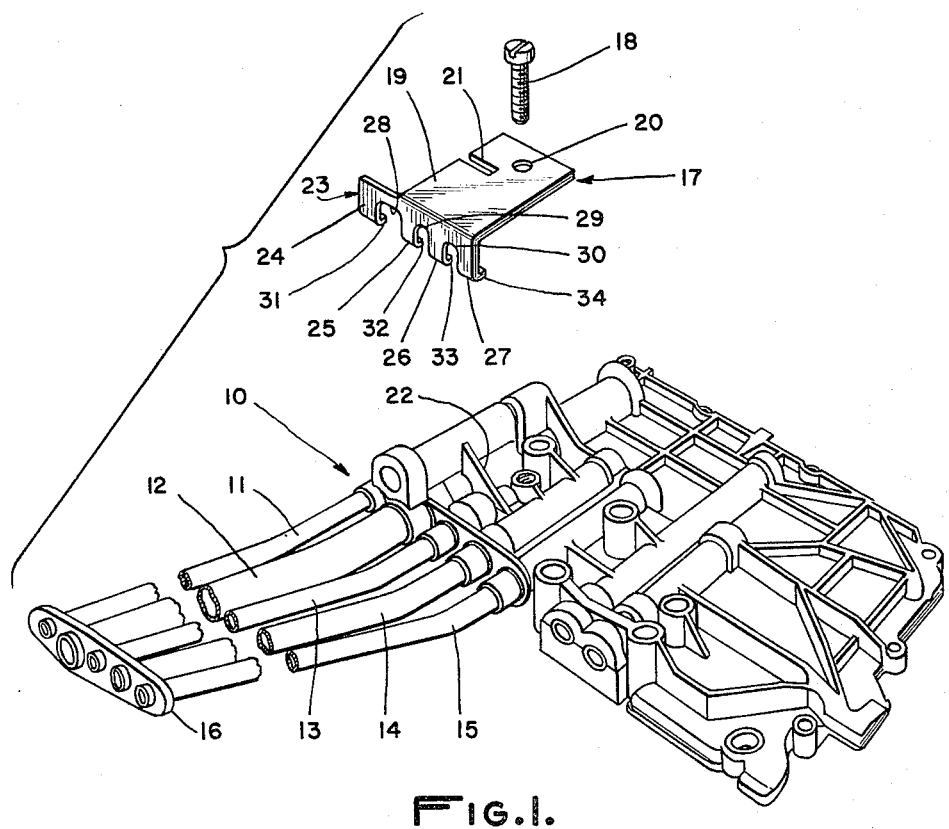
FIG.1.
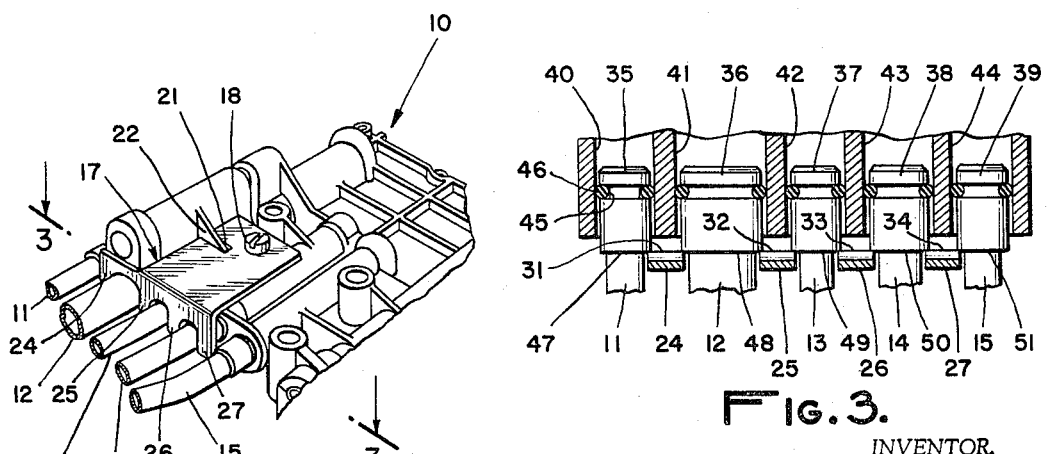
FIG.2.
FIG.3.
INVENTOR.
GILBERT W. YOUNGER
BY
Elliott & Pastoriza
ATTORNEYS

United States Patent Office 3,282,612
Patented Nov. 1, 1966

3,282,612
TUBE RETAINER
Gilbert W. Younger, 2627 Merced Ave., El Monte, Calif.
Filed Nov. 29, 1965, Ser. No. 510,207
1 Claim. (Cl. 285—137)

This invention relates generally to clamps and securing devices, and more particularly to a novel clamp means adapted to secure to a hydraulic control assembly fluid distribution tubes extending from the assembly.

Hydraulic control assemblies comprising a part, for example, of motor vehicle transmissions are subjected to stresses caused by vibration and road shock in addition to the normal stresses of high pressure operation.

As presently arranged, fluid distribution tubes for the hydraulic assembly are held in place by means of a header plate coupled to the far ends of the tubes and secured to a supporting structure spaced from the assembly. The tubes are normally silver-soldered within openings in the plate such that a fairly rigid connection is made, allowing little or no vibration to be accommodated within the connection. Consequently, many of these connections become broken due to vibration and road shock, thereby permitting the far ends of the tubes to work loose from their connections to the plate and telescope through the plate openings. As a result, the other ends connected to the hydraulic assembly are free to work loose from the assembly. A loss of hydraulic fluid is, of course, the result.

The repair of the broken connections is a time-consuming and expensive operation often involving attempts to re-solder the connection and swaging the tubes to prevent their telescoping movement through the header plate.

With the foregoing in mind, it is accordingly a primary object of this invention to provide a novel clamp means for retaining fluid distribution tubes in coupled relationship with a hydraulic control assembly to the end that no losses in hydraulic fluid will occur.

Another object is to accomplish the foregoing object by means of a retaining device which is simple in construction and extremely easy to install without the necessity of modifying the existing structure of the hydraulic assembly in any way.

Briefly, these and many other objects and advantages of this invention are attained by providing a retainer member adapted to be secured on a hydraulic control assembly adjacent the area in which a plurality of fluid distribution tubes are coupled to the assembly. The retainer member includes a down-turned header flange having a plurality of slots adapted to receive the respective tubes.

The ends of the tubes positioned within the hydraulic control assembly are normally provided with enlarged diameter portions forming an annular shoulder positioned outwardly from the assembly. In accordance with a feature of the invention, the header flange includes abutment flanges for engaging the shoulders, thereby effectively preventing movement of the tubes with respect to the hydraulic control assembly.

A better understanding of the invention will now be had by referring to a preferred embodiment thereof as shown by the accompanying drawings, in which:

FIGURE 1 is an exploded perspective view of the hydraulic control assembly in position to receive the novel retaining means of the invention;

FIGURE 2 is a fragmentary perspective view of the novel retaining means in installed position on the hydraulic assembly; and, FIGURE 3 is a cross-sectional view taken in the direction of arrows 3—3 of FIGURE 2.

Referring first to FIGURE 1, there is shown a hydraulic control assembly 10 which may comprise a part, for example, of a fluid-type transmission for motor vehicles. Shown coupled to the assembly 10 are a plurality of fluid distribution tubes 11 through 15.

In accordance with conventional practice, the fluid distribution tubes are held in coupled relationship to the assembly 10 by means of a header plate 16 which is normally coupled to supporting structure in fixed spaced relationship from the assembly. As explained above, the tubes are normally soldered within the header plate 16.

In accordance with the invention, there is provided a retainer clamp 17 which is adapted to be secured to the hydraulic control assembly 10 by means of a screw 18 normally constituting part of the assembly. The clamp 17 includes a top plate 19 within which is disposed an opening 20 adapted to register with an opening in the assembly normally receiving the screw 18. In addition, the top plate may be provided with a slot 21 adapted to receive the brace 22 of the assembly 10.

The clamp 17 includes a down-turned header flange 23 integrally connected to an end of the plate 19 as shown. The header flange 23 preferably includes a plurality of leg members 24 through 27 which are spaced apart to define open-ended arcuate slots 28 through 30, as shown.

Each of the leg members 24 through 27 includes an abutment flange as shown at 31 through 34, extending laterally from the leg members so as to extend generally under and parallel to the plate 19.

Referring now to FIGURE 2, the manner in which the retaining clamp 17 is secured to the hydraulic control assembly 10 will be clearly seen. The clamp 17 is positioned on the assembly 10 after removing the screw 18 with the slot 21 receiving the brace 22. The screw 18 is then reinserted through the registering opening 20. The leg 24 is positioned between the adjacent tubes 11 and 12 and the remaining legs 25 through 27 are similarly positioned between the respective pairs of tubes 12 and 13, 13 and 14, and 14 and 15 as shown. The tubes 12 through 14 are thus received within the respective slots 28 through 30; the slots being best shown in FIGURE 1.

Referring now to FIGURE 3, it will be seen that each of the tubes 11 through 15 terminates in an enlarged diameter portion or ferrules 35 through 39, respectively. The ends of the tubes comprising the ferrules 35 through 39 are positioned within bores 40 through 44, respectively, defined in the hydraulic assembly 10.

Each of the tubes includes an annular groove receiving an O-ring for providing a fluid-tight connection with its respective bore. A typical sealing arrangement is shown for the ferrule 35 by the groove 45 receiving an O-ring 46.

The ferrules 35 through 39 terminate, respectively, in annular shoulders 47 through 51. As shown, the tubes are normally positioned such that the shoulders are disposed a distance outwardly from the assembly 10.

The tubes are retained in position by means of the abutment flanges 31 through 34 engaging the shoulders of the adjacent pairs of tubes. Thus, for example, the flange 31 engages the shoulders 47 and 48 of the respective tubes 11 and 12. In a similar manner, each of the remaining flanges 32 through 34 engages the shoulders of the respective pairs of adjacent tubes.

Referring still to FIGURE 3, it will be seen that the leg members 24 through 27 are spaced outwardly from the shoulders 47-51 of the tubes, a distance equal to the length of each of the flanges 31-34. Further, each of the leg members 24-27 is formed of a width substantially equal to the distance between the adjacent tubes. By this arrangement, pivoting or lateral movement of the tubes with respect to the hydraulic assembly 10, whether as a unit or relative to each other, will be restrained by the interposed legs. Moreover, the engagement of the flanges 31–34 with the shoulders 47–51 will restrain the tubes against axial movement with respect to the hydraulic assembly 10.

From the foregoing, it is apparent that the tubes will be firmly retained within the respective bores regardless of the condition of the header plate connection as shown at 16 in FIGURE 1. Accordingly, even if some or all of the tubes break loose from the header plate, the novel retaining clamp of this invention will prevent the ends of the tubes connected to the assembly from working loose, thereby insuring no leakage of hydraulic fluid.

It is further apparent that the retaining clamp may be quickly and easily installed and removed without modification of the existing structure of the hydraulic assembly.

Various changes falling within the scope and spirit of this invention will occur to those skilled in the art. The retaining clamp structure is, therefore, not to be thought of as limited to the specific embodiment set forth.

What is claimed is:

In a hydraulic control assembly including bores adapted to receive enlarged diameter end portions of a plurality of fluid distribution tubes, a retaining means comprising: plate means adapted to be secured to said assembly; header flange means extending downwardly from an end of said plate means, said header flange means including a plurality of leg members spaced apart to define a plurality of slots for receiving said tubes adjacent to the shoulders formed by said enlarged diameter end portions; each of said leg members having a width substantially equal to the distance between the adjacent tubes, said leg members being spaced outwardly from said shoulders; and abutment means on said leg members, said abutment means including a flange extending laterally from each of said leg members in a direction generally underlying and parallel to said plate means for engaging said shoulders on adjacent tubes for restraining said tubes against axial and lateral movement with respect to said hydraulic control assembly.

References Cited by the Examiner

UNITED STATES PATENTS

| | | | |
|---|---|---|---|
| 2,281,633 | 5/1942 | Stitzer | 285—320 X |
| 2,596,020 | 5/1952 | Fletcher | 285—137 X |
| 2,699,915 | 1/1955 | Goepfrich | 285—305 X |
| 3,010,739 | 11/1961 | Boudreau | 285—197 |

FOREIGN PATENTS

| | | |
|---|---|---|
| 157,716 | 7/1951 | Australia. |
| 745,991 | 3/1956 | Great Britain. |

CARL W. TOMLIN, *Primary Examiner.*